United States Patent
Mutilangi et al.

(10) Patent No.: US 6,783,789 B2
(45) Date of Patent: Aug. 31, 2004

(54) USE OF METAL SALTS TO IMPROVE THE TASTE OF LOW-CALORIE BEVERAGES SWEETENED WITH SUCRALOSE

(75) Inventors: William Mutilangi, Croton-on-Hudson, NY (US); Patricia Amenedo, Valhalla, NY (US); Helen Graham Curtiss, North Salem, NY (US)

(73) Assignee: Pepsico, Inc., Purchase, NY (US)

( * ) Notice: Subject to any disclaimer, the term of this patent is extended or adjusted under 35 U.S.C. 154(b) by 0 days.

(21) Appl. No.: 09/458,677

(22) Filed: Dec. 10, 1999

(65) Prior Publication Data

US 2003/0026879 A1 Feb. 6, 2003

(51) Int. Cl.[7] ................................................. A23L 2/60
(52) U.S. Cl. ...................................... 426/548; 426/590
(58) Field of Search .......................... 426/96, 548, 658, 426/804, 262, 323, 74, 590

(56) References Cited

U.S. PATENT DOCUMENTS

| | | | | | |
|---|---|---|---|---|---|
| 3,934,047 A | * | 1/1976 | Schade | ........................ | 426/212 |
| 4,927,646 A | * | 5/1990 | Jenner et al. | .................. | 426/96 |
| 5,114,723 A | * | 5/1992 | Stray-Gunderson | .......... | 426/74 |

FOREIGN PATENT DOCUMENTS

DE          33 31 517          8/1984

* cited by examiner

*Primary Examiner*—Arthur L. Corbin
(74) *Attorney, Agent, or Firm*—Fitzpatrick, Cella, Harper & Scinto

(57) ABSTRACT

Low-calorie beverage compositions comprising sucralose, acesulfame-K, calcium phosphate, calcium sulfate and potassium sulfate are disclosed. Methods of improving the taste attributes of low-calorie beverages by incorporating sucralose, acesulfame-K, calcium phosphate, calcium sulfate and potassium sulfate therein are also disclosed.

6 Claims, No Drawings

USE OF METAL SALTS TO IMPROVE THE TASTE OF LOW-CALORIE BEVERAGES SWEETENED WITH SUCRALOSE

BACKGROUND OF THE INVENTION

1. Field of the Invention

This invention relates to low-calorie beverage compositions comprising sucralose, acesulfame-K, calcium phosphate, calcium sulfate and potassium sulfate. This invention also relates to methods of improving the taste attributes of low-calorie beverages by incorporating sucralose, acesulfame-K, calcium phosphate, calcium sulfate and potassium sulfate therein.

2. Related Background Art

Generally, when sugar is replaced with artificial sweeteners in the formulation of low-calorie beverages, sweetness character and other taste attributes are significantly altered. Compared to sugar-sweetened beverages, low-calorie beverages are typically described as "thin in mouthfeel", lacking "up-front sweetness" and exhibiting a "metallic, bitter, and lingering sweet aftertaste". These attributes are often used to describe the "diet" taste profile of low-calorie beverages. Currently, no single artificial sweetener delivers the sensory properties of sugar.

It is known that low-calorie beverages containing blends of artificial sweeteners have less "diet" taste than those formulated with a single sweetener. While blending helps to improve the taste profile of artificial sweeteners, this alone is not sufficient to bridge the taste gap between low-calorie and full-calorie beverages.

German Patent DE 33 31 517 broadly relates to acesulfame-containing preparations with improved taste. While combination with other sweeteners is contemplated therein, the patent is directed to the use of acesulfame-K as the primary sweetener; there is no disclosure related to sucralose. The patent discloses the use of soluble salts of inorganic acids, including calcium phosphate, calcium sulfate and potassium sulfate, in combination with acesulfame-K compositions in order to make the "taste better" and to obtain products "superior in taste". The patent also discloses the use of a mixture of salts of inorganic acids. The German patent enumerates a long list of possible additives for acesulfame-K compositions, giving no guidance with respect to what additives will work best or what effects can be achieved. The only calcium and potassium salts exemplified by the German patent are tricalcium phosphate and potassium polyphosphate, and those salts are not exemplified in combination with one another.

SUMMARY OF THE INVENTION

The present invention is directed to low-calorie compositions comprising sucralose and acesulfame-K sweeteners and calcium phosphate, calcium sulfate and potassium sulfate metal salts.

This invention is also directed to a method of improving the taste attributes of a low-calorie beverage by incorporating into the beverage a blend of sweeteners comprising sucralose and acesulfame-K and a blend of metal salts comprising calcium phosphate, calcium sulfate and potassium sulfate.

DETAILED DESCRIPTION

According to the present invention, a selected blend of metal salts modifies the overall sweetness, aftertaste duration, mouthfeel and sucrose-like quality of low-calorie beverages sweetened with a blend of sucralose and acesulfame-K. This taste modification brings the profile closer to the taste of a sugar-sweetened beverage and makes the blend of sucralose and acesulfame-K a potentially effective sweetener system for low-calorie beverages.

Three salts that individually improved the sweetness profile of a blend of sucralose and acesulfame-K were identified and subsequently blended for maximum synergy to optimize their effects. The mixture of salts having maximal positive impact on sweetness quality consists of calcium phosphate, calcium sulfate and potassium sulfate.

Without being bound to theory, divalent cations such as calcium are believed to influence sweetness receptors located on the tongue surface and subsequently the subcellular ion channels. Other salts such as potassium salts may bind onto the bitter receptors, thus promoting cleaner sweetness response.

Thus, one embodiment of the present invention is directed to low-calorie beverage compositions comprising sucralose and acesulfame-K sweeteners and calcium phosphate, calcium sulfate and potassium sulfate metal salts. As used herein, the term "low-calorie beverage composition" refers to cola, orange, lemon, lime, root beer and other flavored beverage compositions in which sugar has been partially or completely replaced with one or more artificial sweeteners.

Sucralose (1,6-dichloro-1,6-dideoxy-beta-D-fructofuranosyl-4-chloro-4-deoxy-alpha-D-galactopyranoside) is a known artificial sweetener. Sucralose suitable for use in the present invention may be obtained in any conventional manner.

Typically sucralose is present in the low-calorie beverage compositions of the present invention in an amount from 0.01% to about 0.03% by weight, based on finished beverage weight (about 100 to 300 ppm).

Acesulfame-K (6-methyl-1,2,3-oxathiazine-4[3H]-one 2,2-dioxide potassium salt) is a known artificial sweetener, approximately 200 times as sweet as sucrose. Acesulfame-K suitable for use in the present invention may be obtained in any conventional manner.

Typically acesulfame-K is present in the low-calorie beverage compositions of the present invention in an amount from 0.004% to about 0.008% by weight, based on finished beverage weight (about 40 to 80 ppm).

The metal salts calcium phosphate, calcium sulfate and potassium sulfate are well known in the art and may be obtained in any conventional manner for use in the present invention.

Typically calcium phosphate is present in the low-calorie beverage compositions of the present invention in an amount from 0.004% to about 0.03% by weight, based on finished beverage weight (about 40 to 300 ppm), while calcium sulfate is present in the low-calorie beverage compositions of the present invention in an amount from 0.0002% to about 0.004% by weight (about 2 to 40 ppm), based on finished beverage weight. Generally potassium sulfate is present in the low-calorie beverage compositions of the present invention in an amount from 0.0002% to about 0.004% by weight (about 2 to 40 ppm), based on finished beverage weight.

The mixture of salts having maximal positive impact on sweetness quality consists of calcium phosphate (80%), calcium sulfate (10%) and potassium sulfate (10%). Such a blend provides improvement of overall sweetness, while reducing sweetness linger and increasing mouthfeel and sucrose quality.

When a blend of metal salts according to the present invention is used at 180+/−10 ppm in low-calorie beverage compositions containing blends of sucralose and acesulfame-K, the taste profile of the formulation is maximally positively impacted. Significantly higher use levels of the selected salts yield an undesirable salty taste, while significantly lower levels provide no significant taste modification benefit.

All of the above concentration ranges are based upon finished beverage weight. A finished beverage, according to the present invention, may comprise any conventional beverage ingredient, in addition to the sucralose, acesulfame-K and metal salt blend. Such beverage ingredients include, without limitation, flavors, acids, colors, water, buffers, and preservatives. Amounts of such ingredients will vary depending upon the type of beverage.

The present invention is also directed to a method of improving the taste attributes of a low-calorie beverage by incorporating into the beverage sucralose and acesulfame-K sweeteners and calcium phosphate, calcium sulfate and potassium sulfate metal salts. In particular, overall sweetness intensity is improved, aftertaste duration is decreased, mouthfeel is increased and sucrose quality is increased.

The Examples which follow are intended as an illustration of certain preferred embodiments of the invention, and no limitation of the invention is implied.

EXAMPLE 1

A low-calorie cola beverage, sweetened with a blend of 225 ppm sucralose and 70 ppm acesulfame-K, was prepared by combining the following: 1.03 g sodium benzoate, 3.49 g acidulant, 5.40 g sucralose, 0.42 g acesulfame-K and 13.70 g cola flavor. The syrup was diluted with carbonated water at a ratio of one part syrup to five parts carbonated water to obtain a beverage characterized by pH 2.7 and titratable acidity of 12.0. To this beverage, calcium phosphate (0.86 g), calcium sulfate (0.11 g) and potassium sulfate (0.11 g) metal salts were added to deliver 144 ppm, 18 ppm and 18 ppm, respectively, in the finished beverage.

COMPARATIVE EXAMPLE 1

A low-calorie cola beverage, sweetened with a blend of 225 ppm sucralose and 70 ppm acesulfame-K, was prepared by combining the following: 1.03 g sodium benzoate, 3.49 g acidulant, 5.40 g sucralose, 0.42 g acesulfame-K and 13.70 g cola flavor. The syrup was diluted with carbonated water at a ratio of one part syrup to five parts carbonated water to obtain a finished beverage characterized by pH 2.7 and titratable acidity of 12.0.

Taste Testing

Beverages made according to Example 1 and Comparative Example 1 were aged at 90° F. for 3 days prior to tasting to allow for flavor equilibration. Sample evaluation was conducted using six expert panelists trained on the sweetness characteristics of sucralose. Evaluation was done by rating the samples on ballots in which the control sample was anchored in the middle of a six point line scale for each attribute. Attributes rated were overall sweetness intensity, aftertaste duration, cola flavor strength, mouthfeel and sucrose quality. All beverages were tasted at room temperature.

The mean scores for the sample containing the optimized salt blend (Example 1) are shown in Table 1 below:

TABLE 1

| attribute | score |
| --- | --- |
| overall sweetness intensity | +2 |
| aftertaste duration | −2 |
| cola flavor strength | 0 |
| mouthfeel | +1 |
| sucrose quality | +2 |

*A score of +/− 1 for an attribute is considered significantly different from the control.

As the results show, use of the optimized salt blend increased overall sweetness, mouthfeel, and sucrose quality while reducing aftertaste duration.

Other variations and modifications of this invention will be obvious to those skilled in this art. This invention is not to be limited except as set forth in the following claims.

What is claimed is:

1. A low-calorie beverage composition comprising sucralose and acesulfame-K sweeteners and a blend of calcium phosphate, calcium sulfate and potassium sulfate metal salts, wherein said blend is present in an amount from about 170 to about 190 ppm.

2. The composition according to claim 1, comprising about 0.01 to about 0.03% by weight sucralose and about 0.004 to about 0.008% by weight acesulfame-K, based on finished beverage weight.

3. The composition according to claim 1, comprising about 0.004 to about 0.03% by weight calcium phosphate, about 0.0002 to about 0.004% by weight calcium sulfate and about 0.0002 to about 0.004% by weight potassium sulfate, based on finished beverage weight.

4. A method of improving the taste attributes of a low-calorie beverage sweetened with sucralose and acesulfame-K sweeteners comprising the step of adding a blend of calcium phosphate, calcium sulfate and potassium sulfate metal salts to the low-calorie beverage, wherein the blend is present in an amount from about 170 to about 190 ppm.

5. The method according to claim 4, comprising about 0.01 to about 0.03% by weight sucralose and about 0.004 to about 0.008% by weight acesulfame-K, based on finished beverage weight.

6. The method according to claim 4, comprising about 0.004 to about 0.03% by weight calcium phosphate, about 0.0002 to about 0.004% by weight calcium sulfate and about 0.0002 to about 0.004% by weight potassium sulfate, based on finished beverage weight.

* * * * *